US011914327B2

(12) United States Patent
Saglini

(10) Patent No.: US 11,914,327 B2
(45) Date of Patent: Feb. 27, 2024

(54) TIMEPIECE INDEXING ELEMENT

(71) Applicant: ETA SA Manufacture Horlogère Suisse, Grenchen (CH)

(72) Inventor: Julien Saglini, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 504 days.

(21) Appl. No.: 17/225,213

(22) Filed: Apr. 8, 2021

(65) Prior Publication Data

US 2021/0349423 A1 Nov. 11, 2021

(30) Foreign Application Priority Data

May 5, 2020 (EP) .................................... 20172880

(51) Int. Cl.
*G04B 13/02* (2006.01)
*G04B 31/02* (2006.01)

(52) U.S. Cl.
CPC ........... *G04B 13/021* (2013.01); *G04B 31/02* (2013.01)

(58) Field of Classification Search
CPC ...... G04B 13/021; G04B 31/02; G04B 33/02; H04M 1/0216; F16H 55/14
See application file for complete search history.

(56) References Cited

U.S. PATENT DOCUMENTS

| | | | | |
|---|---|---|---|---|
| 2016/0026154 A1* | 1/2016 | Courvoisier | ......... | G04B 13/022 368/184 |
| 2017/0242399 A1 | 8/2017 | Feyer | | |

FOREIGN PATENT DOCUMENTS

| | | | | | |
|---|---|---|---|---|---|
| CH | 701075 | B1 * | 11/2010 | ........... | G04B 13/023 |
| CN | 107102527 | A | 8/2017 | | |
| EP | 3252546 | A1 * | 12/2017 | ........... | G04B 17/063 |
| JP | 56-12883 | U | 2/1981 | | |
| JP | 57-070176 | U | 4/1982 | | |
| JP | 06-040890 | U | 5/1994 | | |
| JP | 2017-146305 | A | 8/2017 | | |
| WO | 2013/014515 | A1 | 1/2013 | | |
| WO | WO-2013014515 | A1 * | 1/2013 | ............. | F16D 41/12 |

OTHER PUBLICATIONS

European Search Report of EP 20172880 dated Oct. 16, 2020.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A timepiece indexing element (10), coaxially cooperating with a component (20) including an indexing relief (30), including indexing parts (13) cooperating with this indexing relief (30) for their relative indexing in a plurality of indexing positions, and carried by first elastic arms (14) each including a first indexing surface (15), each first elastic arm (14) being arranged to exert a pushing force that is substantially radial relative to this component (20), and this indexing element (10) includes at least a first bearing surface (11) arranged, in the free state in a service position, to remain at a distance from a second complementary bearing surface (21) that a component (20) includes, and in the event of impact, to cooperate in abutment and/or guide bearing with the second complementary bearing surface (21), each first bearing surface (11) being carried by a second elastic bearing arm (40) cantilevered in the indexing element (10).

22 Claims, 5 Drawing Sheets

TIMEPIECE INDEXING ELEMENT

CROSS REFERENCE TO RELATED APPLICATIONS

This application is claiming priority based on European Patent Application No. 20172880.5 filed on May 5, 2020, the disclosure of which is incorporated herein in its entirely by reference.

FIELD OF THE INVENTION

The invention relates to a timepiece indexing element, arranged to cooperate in a substantially coaxial manner, around an axis around which said indexing element extends, with a timepiece component including an indexing relief defining a plurality of indexing positions, said indexing element including a first bearing surface arranged to cooperate in abutment bearing with a second complementary bearing surface that said component includes, and including elastic return elements arranged to exert a pushing force that is substantially radial relative to said axis on said component in order to bearingly press it against said first bearing surface, and including indexing parts arranged to cooperate with said indexing relief of said component for relative indexing between said indexing element and this said component.

The invention also relates to a timepiece assembly including at least one such indexing element, and at least one such timepiece component including an indexing relief defining a plurality of indexing positions, said at least one indexing element and said at least one component being arranged to cooperate with one another in a substantially coaxial manner, around said axis, for their relative indexing relative to one another.

The invention also relates to a timepiece mechanism including at least one such indexing element, and/or such a timepiece assembly.

The invention also relates to a timepiece, in particular a watch, including at least one such timepiece mechanism and/or at least one such indexing element, and/or such a timepiece assembly.

The invention also relates to the field of timepiece mechanisms, and in particular display, and/or adjustment, and/or selection mechanisms.

BACKGROUND OF THE INVENTION

In timepiece display mechanisms such as time zone displays, often the time zone/hour jumping wheels consist of several platforms/pinions, linked together by a star/cam constrained by a spring element (pawl). Such systems have a high space requirement.

The spring elements of these systems are often pushed to their maximum, which does not allow obtaining significant rise values, which are necessary to ensure winding and operation. In addition, dimensional variations during production lead to significant force variations at these springs, the forces are not reproducible.

Document JP H06 40890 U in the name of CITIZEN WATCH describes an indexable watch mobile.

Document JP S57 70176 U in the name of SEIKO also describes an indexable timepiece mobile.

SUMMARY OF THE INVENTION

The invention simultaneously proposes to make the adjustment and indexing mechanisms more reliable, to reduce their thickness, and to guarantee precise and controlled indexing between two elements.

This involves, again, limiting the stresses undergone by the elastic elements.

And finally, the dispersion of force values, attributable to the difficulty of respecting, in a reproducible manner, production tolerances, must be overcome.

To this end, the invention relates to a timepiece indexing element, according to claim 1.

The invention also relates to a timepiece assembly including at least one such indexing element, and at least one such timepiece component including an indexing relief defining a plurality of indexing positions, said at least one indexing element and said at least one component being arranged to cooperate with one another in a substantially coaxial manner, for their relative indexing relative to one another.

The invention also relates to a timepiece mechanism including at least one such indexing element, and/or such a timepiece assembly.

The invention also relates to a timepiece, in particular a watch, including at least one such timepiece mechanism and/or at least one such indexing element, and/or such a timepiece assembly.

BRIEF DESCRIPTION OF THE DRAWINGS

Other features and advantages of the invention will become apparent upon reading the detailed description which follows, with reference to the appended drawings, where.

DETAILED DESCRIPTION OF THE PREFERRED EMBODIMENTS

Figure 1:
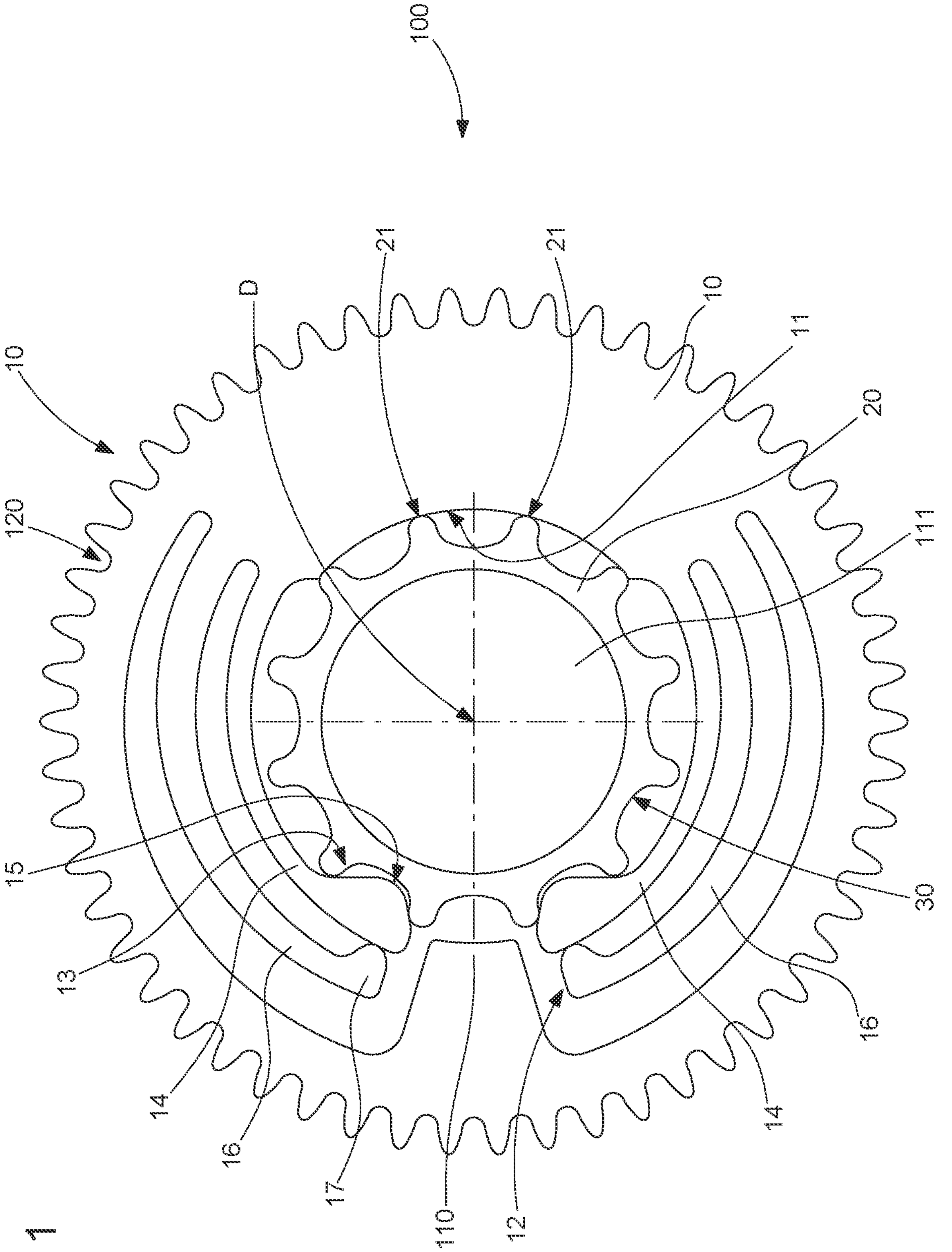
FIG. 1 shows, schematically, and in a flat manner, a timepiece assembly including on the one hand an indexing element which is here a toothed wheel including, cut from its platform, two pairs of elastic arms, and on the other hand a timepiece component including an indexing relief defining a plurality of indexing positions, this indexing relief here being formed by a toothing; this indexing element and this component cooperate with one another coaxially, bearing in one another. In each pair of elastic arms, the innermost arm performs indexing by cooperating with the indexing relief, and performs a first pressure on the latter. In each pair the outermost elastic arm, coplanar with the inner arm, bears on the latter with a return torque greater than its own. This figure is shown in a stable indexed position.

The invention relates to a timepiece indexing element 10, arranged to cooperate in a substantially coaxial manner, around an axis D around which this indexing element 10 extends, with a timepiece component 20:

This component 20 includes an indexing relief 30, defining a plurality of indexing positions. This indexing relief can be formed by a toothing as illustrated by the figures, or by a flute, or by indentations, or protrusions, or pins, or the like.

The indexing element 10 includes a first bearing surface 11, which is arranged to cooperate, at least in the impact configuration, in abutment and/or guide bearing with a second complementary bearing surface 21 that such a component 20 includes. In the case of FIGS. 1 to 6 it is a permanent contact, and this contact area between the indexing element 10 and the component 20 ensures the perfect positioning of one relative to the other: their position is both known and controlled.

In the case of the invention, in normal operation, in the service position, each first bearing surface 11 is at a distance from a second complementary bearing surface 21, with a non-zero clearance, of a few micrometres or tens of micrometres. In the event of impact, the first bearing surface 11 provides both an abutment function and a guiding function of the component 20.

The indexing element 10 includes elastic return elements, marked 12 in FIGS. 1 to 6, which are arranged to exert a pushing force that is substantially radial, relative to the axis D, on such a component 20, to bearingly press it on a contact surface, or on the bearing surface 11.

The indexing element 10 includes indexing parts 13, which are arranged to cooperate with an indexing relief 30 of a component 20 for relative indexing between the indexing element 10 and this component 20. These indexing parts 13 are in particular teeth, lugs, or the like.

According to the invention, the elastic return elements 12 include at least a first elastic arm 14, including a first indexing surface 15 which the indexing parts 13 include. And this first elastic arm 14 is arranged to exert a pushing force which is substantially radial relative to the axis D on such a component 20.

Figure 2:
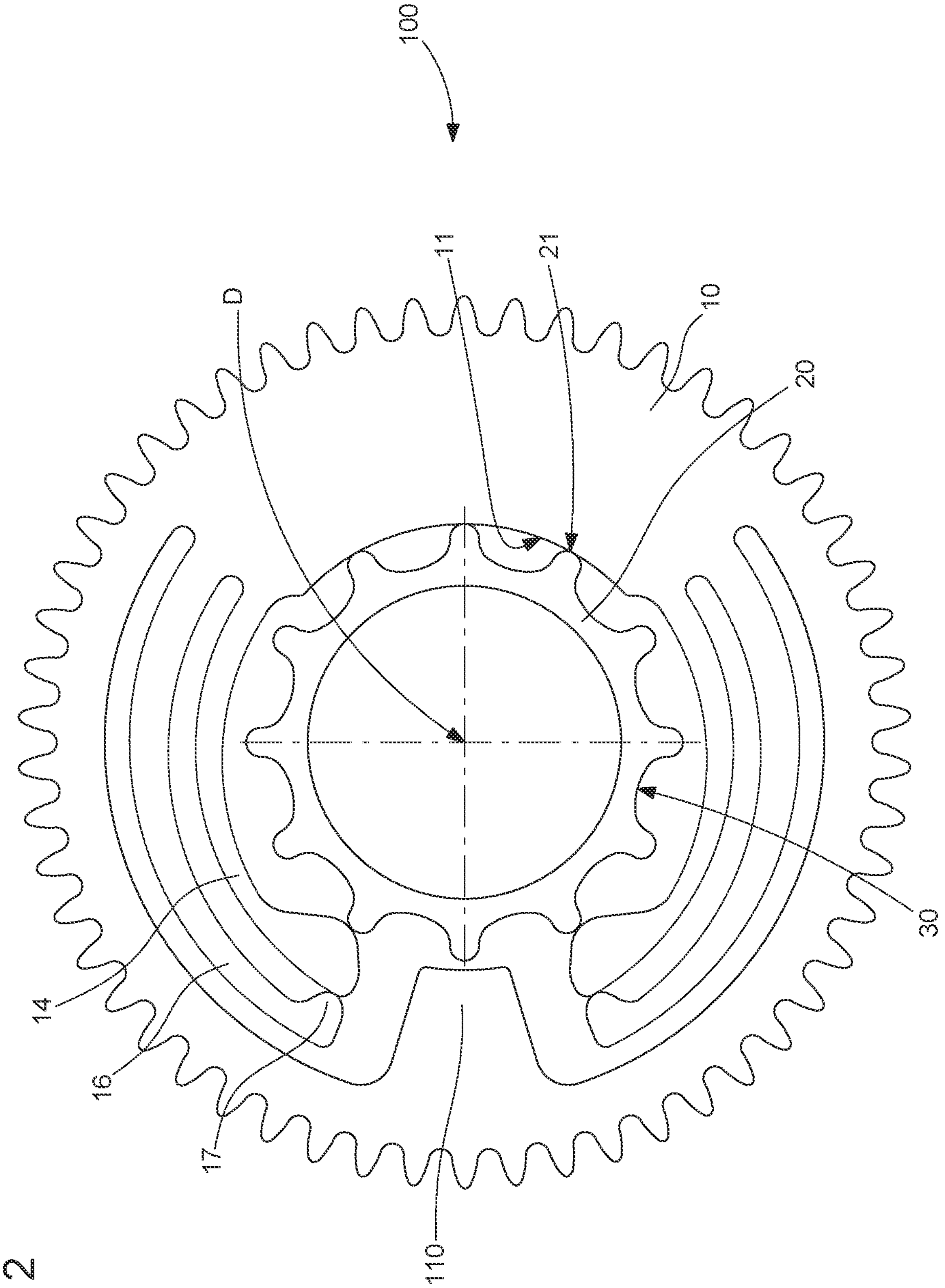
FIG. 2 shows, similarly to FIG. 1, the same mechanism in a transition position, wherein the inner elastic arms are bearing on the tips of teeth of the indexing relief; the inner and outer elastic arms are then in their maximum radial elongation.
Figure 3:
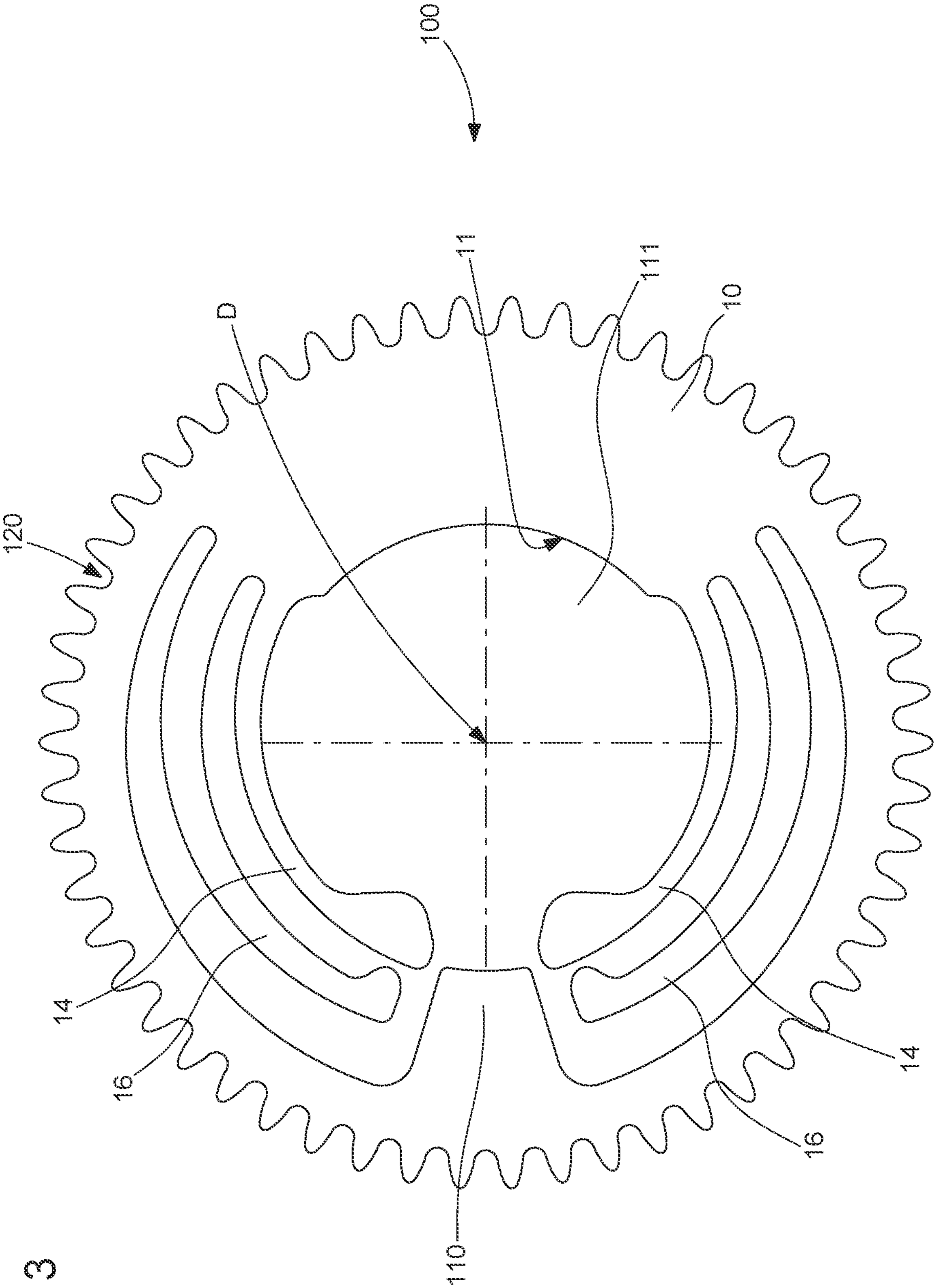
FIG. 3 shows, similarly to FIG. 1, the indexing element alone, in the free state, wherein the inner and outer elastic arms are in the rest position, as close as possible to the axis.
Figure 4:
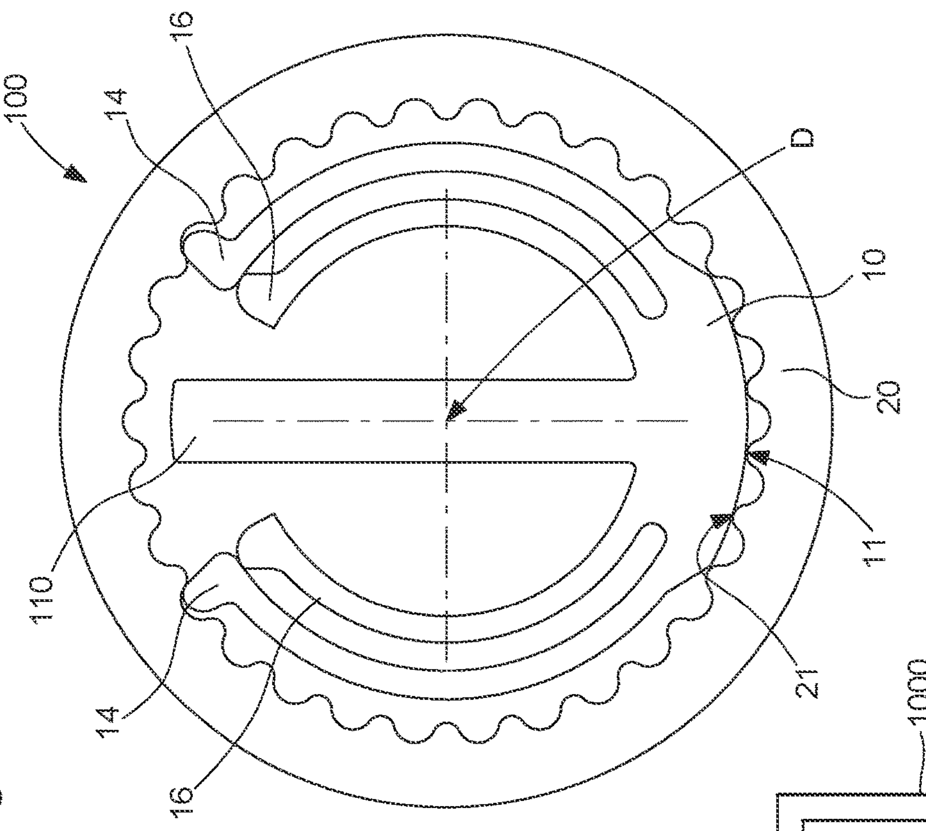
FIG. 4 shows, similarly to FIG. 1, an inverse configuration, where the component including the indexing relief surrounds the indexing element, and where the outer elastic arms cooperate with the latter, while the inner elastic arms press on the outer elastic arms.
Figure 7:
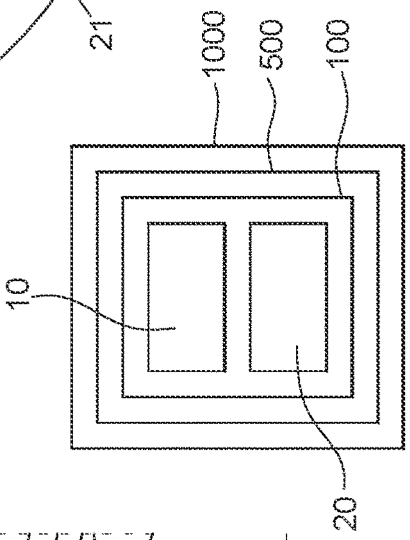
FIG. 7 is a block diagram showing a timepiece, in particular a watch, including a timepiece mechanism itself including such an assembly with such an indexing element, and such a component.
Figure 5:
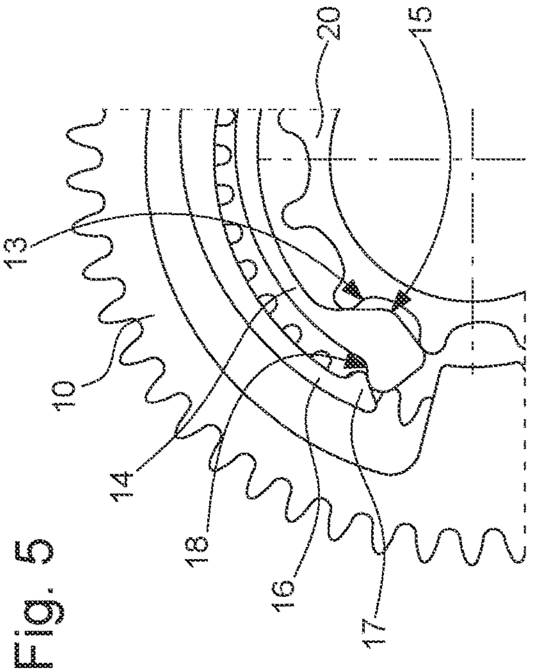
FIG. 5 shows, similarly to FIG. 1, a detail of a variant where the inner elastic arm includes a notch with which a boss of the outer elastic arm can cooperate.
Figure 6:
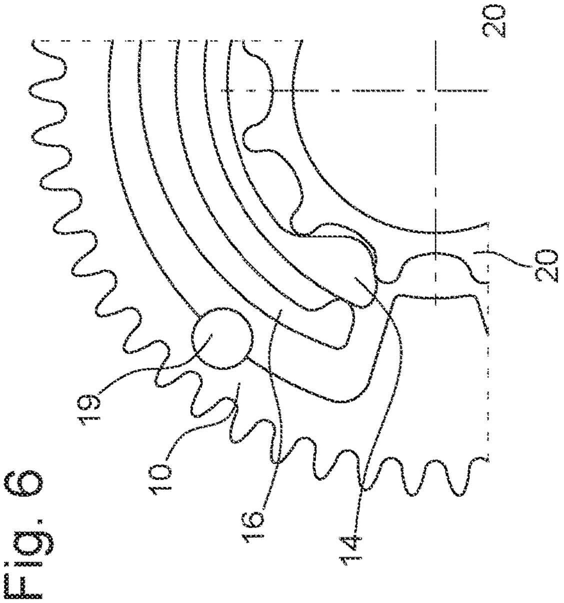
FIG. 6 shows, similarly to FIG. 1, a detail of another variant where a blocking element, such as a pin, is inserted at the factory after adjustment, to limit the movement of the inner elastic arm and of the outer elastic arm to a simple impact damping clearance, but does not allow a change of indexing in the preliminary extraction of this blocking element.

In a particular arrangement, as can be seen in the embodiments of FIGS. 1 to 6, the elastic return elements 12 also include at least one second elastic arm 16, which is arranged to exert a pushing force which is substantially radial relative to the axis D on at least one first elastic arm 14. More particularly, in a pair consisting of a first elastic arm 14 and a second elastic arm 16, the second elastic arm 16 is arranged to exert a return torque greater than the return torque of the first elastic arm 14. More particularly, in a pair consisting of a first elastic arm 14 and a second elastic arm 16, the second elastic arm 16 is arranged to travel, in its bending travel, a radial extension (or rise) which is less than that of the first elastic arm 14. For example, on the mechanism illustrated in FIGS. 1 to 3, the application of which is the driving of the time and of a date indicator of the watch, the first inner elastic arm 14 has a rise of 0.26 mm, while that of the second elastic arm 16 is 0.21 mm. This arrangement allows the torque retention to be ensured, and here guarantees a minimum torque of 1.2N·mm. In particular, and as illustrated by FIGS. 1 to 6, the indexing element 10 includes a plurality of pairs (two pairs in the non-limiting case of the figures), each consisting of a first elastic arm 14 and a second elastic arm 16, and each arranged to exert on a component 20 a force substantially diametrically opposite, relative to the axis D, to the first bearing surface 11. More particularly, at least one second elastic arm 16 includes a lug 17 which is arranged to cooperate with a notch 18 included by a first elastic arm 14 with which this second elastic arm 16 cooperates, for locking this first elastic arm 14 in the indexing position, in the factory or in an after-sales service; to be implemented by a user, such a variant requires the arrangement of additional means, not shown here, to release the lug 17 from the notch 18. More particularly, the indexing element 10 includes at least one blocking element 19, which is arranged to block a second elastic arm 16 bearing on a first elastic arm 14 with which this second elastic arm 16 cooperates; this blocking can be a blocking with a slight clearance, to allow a small radial travel of the first elastic arm 14 and of the second elastic arm 16 in the event of impact, when the mechanism is incorporated into a watch; again, such a blocking concerns a factory adjustment or in an after-sales service. Preferably, within the same pair, the first elastic arm 14 and the second elastic arm 16 are substantially parallel to each other. In a particular arrangement, and as illustrated by FIGS. 1 to 6, the first elastic arms 14 and second elastic arms 16 are curved, in particular substantially circular and centred on the axis D, for a good distribution of the constraints. In a variant as illustrated by FIGS. 1 to 3, the indexing element 10 includes an inner chamber 111, delimited by the bearing surface 11 and each first elastic arm 14, and which is arranged to surround an indexing relief 30 of a component 20, and each first elastic arm 14 is closer to the axis D than each second elastic arm 16. In another variant as illustrated in FIG. 4, the indexing element 10 is arranged to be inserted into a chamber delimited by an indexing relief 30 of a component 20, and each first elastic arm 14 is further from the axis D than each second elastic arm 16.

In an advantageous variant, and as visible in FIGS. 1 to 6, the indexing element 10 includes at least one boss 110 diametrically opposite, relative to the axis D, to the first bearing surface 11, to form an anti-impact abutment limiting the relative radial movement, in the event of impact, between the indexing element 10 and a component 20 assembled together in an indexed position.

Figure 8:
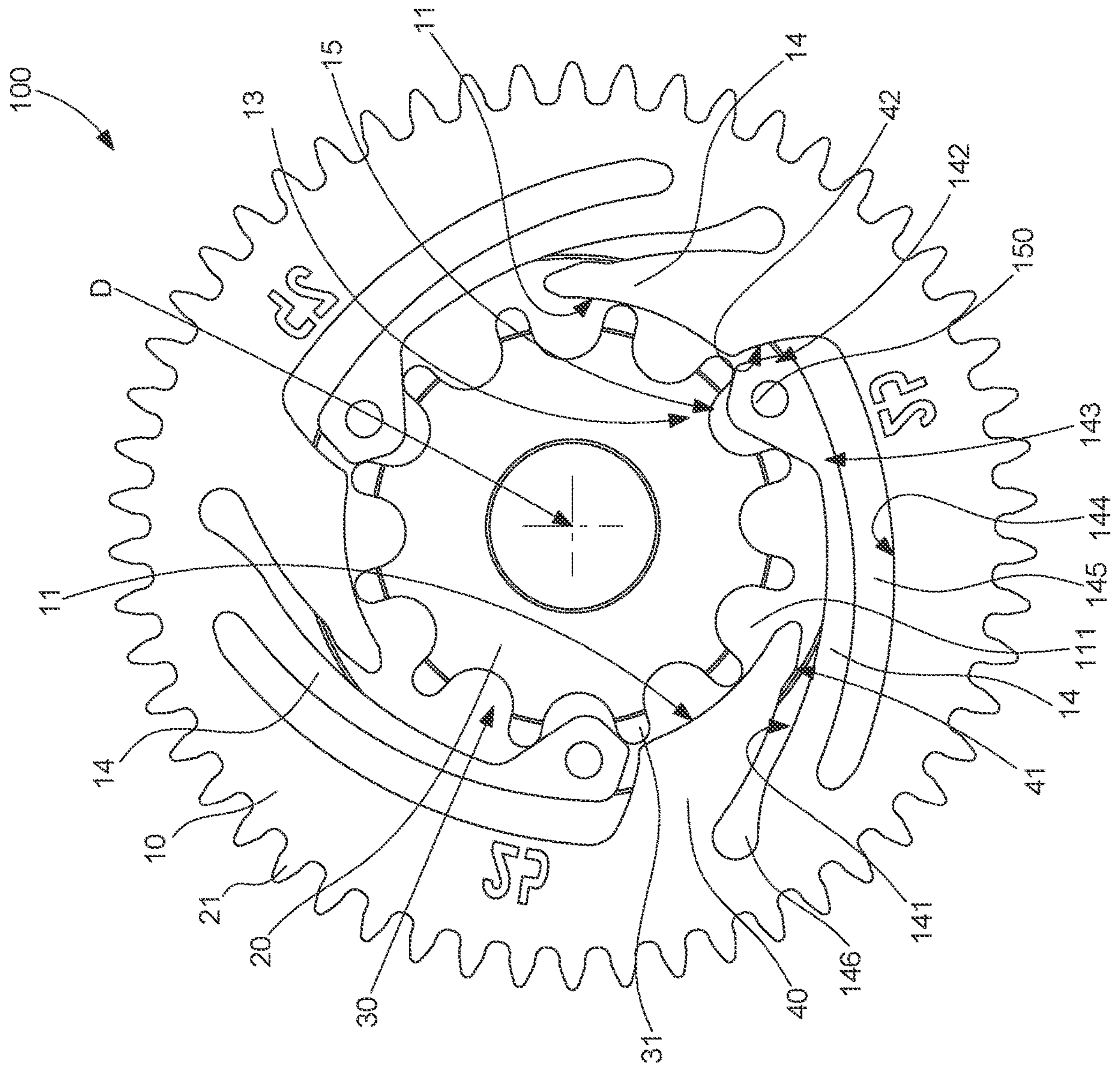
FIG. 8 shows, schematically, and in a flat manner, a timepiece assembly according to the invention, where the indexing element includes an alternation of first elastic arms, arranged to cooperate with the indexing relief of the component, and second arms, which each include a bearing surface which, in the service position, is remote from the indexing relief, and which, in the event of impact, constitute abutment and/or guide bearing surfaces of the component.

FIG. 8 illustrates a mechanism according to the invention, arranged to ensure proper operation, with maintenance of the geometry, even in the event of impact.

Thus the invention relates to a timepiece indexing element 10, arranged to cooperate in a substantially coaxial manner, around an axis D around which this indexing element 10 extends, with a timepiece component 20 including an indexing relief 30. The indexing element 10 includes indexing parts 13, which are arranged to cooperate with such an indexing relief 30 of a component 20, for relative indexing between this indexing element 10 and this component 20 from a plurality of relative indexing positions.

These indexing parts 13 are carried by a plurality of first elastic arms 14 each including a first indexing surface 15, each first elastic arm 14 being arranged to exert a pushing force that is substantially radial relative to the axis D on this component 20.

And the indexing element 10 includes at least a first bearing surface 11, which is arranged, in the free state in a service position, to remain at a distance from a second complementary bearing surface 21 that a component 20 includes, and in the event of impact, to cooperate in abutment and/or guide bearing with the second complementary bearing surface 21.

More particularly, the clearance in the service position between each first bearing surface 11 and each second complementary bearing surface 21 is strictly positive, that is to say not zero.

According to the invention, each first bearing surface 11 is carried by a second bearing arm 40 cantilevered inside the indexing element 10. In a preferred variant, at least a second bearing arm 40, and more particularly each second bearing arm 40, is elastic.

More particularly, the indexing element 10 includes a plurality of first bearing surfaces 11, which are arranged to surround a component 20 and keep it substantially coaxial with the indexing element 10 in the event of impact.

More particularly, each first bearing surface 11 is arranged to cooperate simultaneously with several protruding reliefs 31, in particular teeth, that the indexing relief 30 of the component 20 includes.

More particularly, each second bearing arm 40 includes a first outer limiting surface 41, which is arranged to limit the centripetal travel of a first elastic arm 14 or to move a first elastic arm 14 away from the axis D upon impact.

More particularly, the indexing element 10 includes an alternation of second bearing arms 40 and first elastic arms 14, all protruding internally from a substantially annular structure, towards the axis D.

More particularly, each first elastic arm 14 includes a housing 150 or a protuberance for its handling by a concentric clamping tool for cooperating it with an indexing relief 30 of a component 20, or for its dismantling.

More particularly, each second bearing arm 40 includes a second inner limiting surface 42, which is arranged to limit the centrifugal travel of a first elastic arm 14.

It is understood that the invention can be used indifferently with the movable indexing element 10 and the fixed component 20, or the fixed indexing element 10 and the movable component 20, or the indexing element 10 and the component 20 both movable, or else the indexing element 10 and the component 20 both fixed for a factory adjustment for example.

In a variant, the indexing element 10 is a mobile arranged to pivot around the axis D and around a component 20 with which it cooperates.

More particularly, the indexing element 10 includes drive parts 120, such as teeth, a flute, indentations, bores, protrusions, pegs, pins, belt or chain groove, or the like.

In a variant, the indexing element 10 is arranged to be fixed in a fixed angular position on a structure of a movement or of a timepiece mechanism.

More particularly, the indexing element 10 is made of a micro-machinable material, which can be produced by a method of the "LIGA" type (from the German "Rontgenlithographie, Galvanoformung, Abformung": lithography, galvanisation, forming) or the like, made of silicon, or silicon oxide, or nickel-phosphorus NiP, or any similar material of use which is now common in watchmaking and suitable for manufacturing thin integral components including elastic strips.

The invention is particularly suitable for the production of components for watches, of small dimensions, for example with an overall diameter of less than 5 mm, and a thickness of a few tenths of a millimetre.

The invention also relates to a timepiece assembly 100 including at least one such indexing element 10, and at least one such timepiece component 20 including an indexing relief 30 defining a plurality of indexing positions. This at least one indexing element 10 and this at least one component 20 are arranged to cooperate with one another in a substantially coaxial manner, around the axis D, for their relative indexing relative to one another, with the first bearing surface 11 arranged to cooperate in abutment bearing with a second complementary bearing surface 21 that this at least one component 20 includes, and the indexing parts 13 arranged to cooperate with a indexing relief 30 of such a component 20 for relative indexing between the concerned indexing element 10 and component 20.

In the variant of FIGS. 1 to 3, the indexing element 10 includes an inner chamber 111, delimited by the bearing surface 11 and each first elastic arm 14, arranged to surround an indexing relief 30 of a component 20, and each first elastic arm 14 is closer to the axis D than each second elastic arm 16.

In the variant of FIG. 4, the indexing element 10 is arranged to be inserted into a chamber delimited by an indexing relief 30 of a component 20, and each first elastic arm 14 is further from the axis D than each second elastic arm 16.

More particularly, the timepiece assembly 100 includes a single indexing element 10, and a single component 20.

In one variant, the component 20 is a mobile.

In another variant, the component 20 is designed to be fixed in a fixed angular position on a structure of a movement or a timepiece mechanism.

More particularly, the indexing element 10 and the indexing relief 30 of the component 20 are both delimited by the same upper plane and the same lower plane, which are perpendicular to the axis D. More particularly still, they have the same thickness.

The invention also relates to a timepiece mechanism 500 including at least one such indexing element 10, and/or such a timepiece assembly 100.

The invention also relates to a timepiece 1000, in particular a watch, including at least one such timepiece mechanism 500, and/or at least one indexing element 10, and/or a timepiece assembly 100.

Compared to the prior art where it was usual to juxtapose a toothed wheel side by side with spring elements, the invention, while ensuring the disengagement of the two indexed elements, allows a Z level to be gained, that is to say to reduce the total thickness.

Putting two elastic arms, or spring elements, in parallel makes it possible to obtain the desired torque, to limit the constraints undergone, and to have a significant flexion rise (radial extension of the elastic arms). A large rise allows the influence of production variations to be reduced.

Within each pair, one of the elastic arms ensures the positioning and indexing, and part of the bearing torque, and the other spring ensures most of the resulting bearing torque.

If the invention is illustrated here with an indexing element 10 and a component 20 which are both toothed wheels, it will be understood that the invention is suitable for numerous horological applications: column wheel, date ring, time zone indicator, lever, display disc, day/night indicator, AM/PM indicator, leap year display, moon phase, or the like.

Finally, the correct orientation of the bearing forces exerted by the spring elements allows a positioning of an element relative to the other to be ensured, in a known manner, at all times.

In short, the invention allows an appreciable saving in terms of space requirement to be obtained, in particular in thickness, to minimise the risk of breakage of the spring elements, and to ensure better control of the forces.

The invention claimed is:

1. A timepiece indexing element, arranged to cooperate in a substantially coaxial manner, around an axis around which said indexing element extends, with a timepiece component including an indexing relief, including indexing parts arranged to cooperate with said indexing relief of said component for relative indexing between said indexing element and said component from a plurality of relative indexing positions, where said indexing parts are carried by a plurality of first elastic arms each including a first indexing surface, each said first elastic arm being arranged to exert a pushing force that is substantially radial relative to said axis on said component, and where said indexing element includes at least a first bearing surface which is arranged, in a free state in a service position, to remain at a distance from a second complementary bearing surface that said component includes, and in the event of impact, to cooperate in abutment and/or guide bearing with said second complementary bearing surface, wherein each said first bearing surface is carried by a second elastic bearing arm cantilevered inside said indexing element.

2. The indexing element according to claim 1, wherein the clearance in said service position between each said first bearing surface and each said second complementary bearing surface is strictly positive.

3. The indexing element according to claim 1, wherein said indexing element includes a plurality of said first bearing surfaces arranged to surround said component and keep it substantially coaxial with said indexing element in the event of impact.

4. The indexing element according to claim 1, wherein each said first bearing surface is arranged to cooperate simultaneously with several protruding reliefs that said indexing relief of said component includes.

5. The indexing element according to claim 1, wherein each said second bearing arm includes a first outer limiting surface arranged to limit the centripetal travel of said first elastic arm or to move said first elastic arm away from said axis upon impact.

6. The indexing element according to claim 1, wherein said indexing element includes an alternation of said second bearing arms and said first elastic arms, all protruding internally from a substantially annular structure, towards said axis.

7. The indexing element according to claim 1, wherein each said first elastic arm includes a housing or a protuberance for its handling by a concentric clamping tool for cooperating it with said indexing relief of said component or for its dismantling.

8. The indexing element according to claim 1, wherein each said second bearing arm includes a second inner limiting surface arranged to limit the centrifugal travel of said first elastic arm.

9. The indexing element according to claim 1, wherein said indexing element is a mobile arranged to pivot around said axis and around said component with which it cooperates.

10. The indexing element according to claim 9, wherein said indexing element includes drive or positioning means.

11. The indexing element according to claim 10, wherein said drive or positioning means include toothing.

12. The indexing element according to claim 1, wherein said indexing element is arranged to be fixed in a fixed angular position on a structure of a movement or of a timepiece mechanism.

13. The indexing element according to claim 1, wherein said indexing element is made of nickel-phosphorus NiP.

14. A timepiece assembly including the indexing element according to claim 1, and a timepiece component including an indexing relief defining a plurality of indexing positions, said at least one indexing element and said component being arranged to cooperate with one another in a substantially coaxial manner, around said axis, for their relative indexing relative to one another, with said first bearing surface arranged to cooperate in abutment or guide bearing with a second complementary bearing surface that said component includes, and said indexing parts arranged to cooperate with said indexing relief of said component for relative indexing between said indexing element and said component.

15. The timepiece assembly according to claim 14, wherein said indexing element includes an inner chamber arranged to surround said indexing relief of said component, and wherein each said first elastic arm is closer to said axis than each said first bearing surface.

16. The timepiece assembly according to claim 14, wherein said indexing element is arranged to be inserted into a chamber delimited by said indexing relief of said component, and wherein each said first elastic arm is further from said axis than each said first bearing surface.

17. The timepiece assembly according to claim 14, wherein said timepiece assembly includes a single said indexing element, and a single said component.

18. The timepiece assembly according to claim 14, wherein said component is a mobile.

19. The timepiece assembly according to claim 14, wherein said component is arranged to be fixed in a fixed angular position on a structure of a movement or of a timepiece mechanism.

20. The timepiece assembly according to claim 14, wherein said indexing element and said indexing relief of the component are both delimited by the same upper plane and the same lower plane, which are perpendicular to said axis.

21. A timepiece mechanism including the indexing element according to claim 1.

22. A timepiece including the timepiece mechanism according to claim 21.

* * * * *